March 23, 1954 A. MASABNY 2,673,283

ILLUMINATING MEANS FOR DIAL TELEPHONES

Filed May 19, 1951 3 Sheets-Sheet 1

INVENTOR.

Anthony Masabny.

BY Louis C. Smith

Attorney.

March 23, 1954 A. MASABNY 2,673,283

ILLUMINATING MEANS FOR DIAL TELEPHONES

Filed May 19, 1951 3 Sheets-Sheet 2

INVENTOR.
Anthony Masabny.
BY Louis C. Smith
Attorney.

March 23, 1954 A. MASABNY 2,673,283

ILLUMINATING MEANS FOR DIAL TELEPHONES

Filed May 19, 1951 3 Sheets-Sheet 3

INVENTOR.
Anthony Masabny
BY Louis C. Smith
Attorney.

Patented Mar. 23, 1954 2,673,283

UNITED STATES PATENT OFFICE 2,673,283

ILLUMINATING MEANS FOR DIAL TELEPHONES

Anthony Masabny, Allston, Mass.

Application May 19, 1951, Serial No. 227,201

3 Claims. (Cl. 240—2.17)

This invention relates to a device for illuminating automatically the dial of a telephone set when the receiver is removed from its cradle and for terminating the illumination when the receiver is replaced on the cradle.

The features wherein the invention resides will be hereinafter described and then pointed out in the appended claims.

Figure 1:
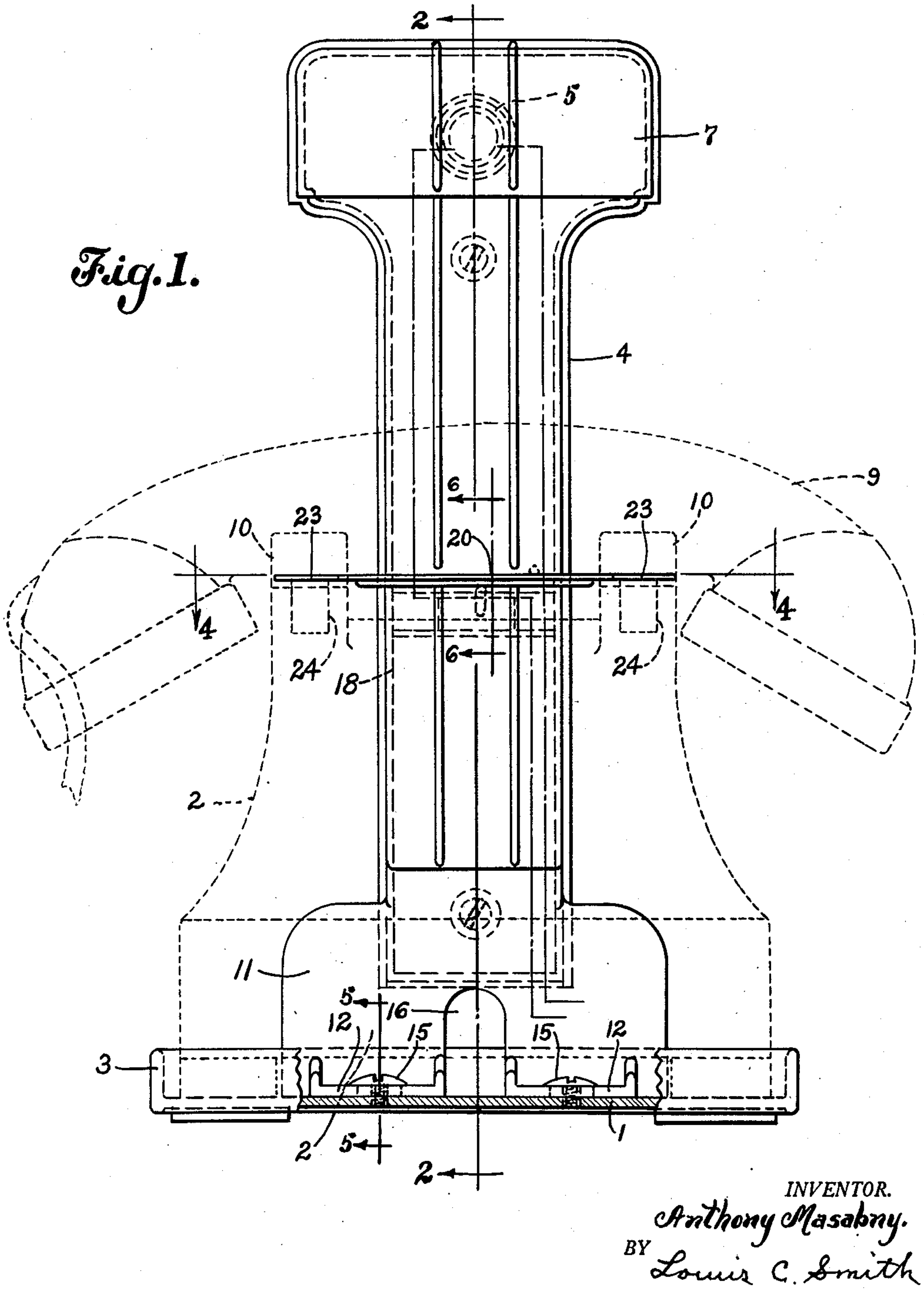
Fig. 1 is a front view of a device embodying my invention.

The device herein shown comprises a suitable tray-like base 1 of a size to receive the telephone instrument 2, which is illustrated in dotted lines, said base having a curb 3 rising therefrom at its periphery within which the telephone instrument is received and by which the instrument is retained in proper position on the base.

Rising from the base at its rear end is a hollow post or column 4 which extends to a point well above the telephone instrument mounted on the base and which carries at its upper end a socket 37 for an electric light bulb 5, said bulb being situated above the telephone instrument and adapted to illuminate the dial 6 thereof. The column 4 is provided with a hood 7 within which the light bulb is received, said hood having an opening 8 in its underside through which the light from the bulb 5 is projected onto the dial 6 when the receiver 9 is lifted from its cradle 10.

The column 4 is shown as having a widened portion 11 at its lower end from which project two feet 12 which rest on and are secured to the base 1. Each foot has an opening 13 which receives a boss 14 rising from the base and the feet are secured to the base by screws 15 which screw into tapped holes in the bosses.

The two feet are spaced apart, thereby providing between them a slot or opening 16 through which the telephone cord 17 passes.

Situated within the column 4 is a switch 18 which is mounted on a shelf 26 extending from the front wall of the column, said switch being located in the circuit 19 of the lamp bulb 5.

Means are provided whereby when the receiver 9 is in place on the cradle 10 the switch 18 will be open and hence the bulb will not be lighted, but when the receiver is removed from the cradle the switch will be automatically closed, thereby lighting the bulb.

Figures 2, 3:
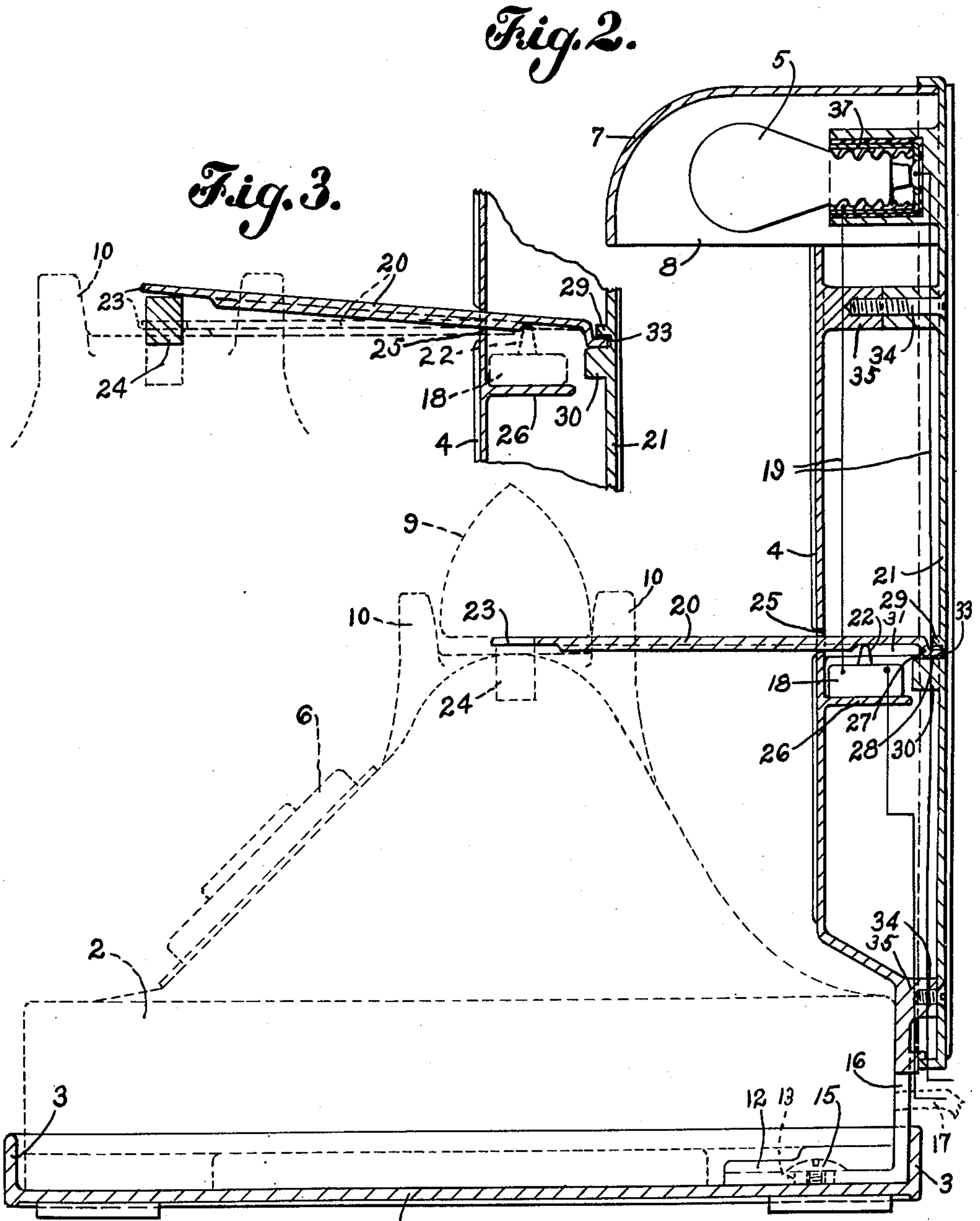
Fig. 2 is a section on line 2—2 Fig. 1.
Fig. 3 is a fragmentary sectional view on the line 3—3 Fig. 4.
Figure 5:
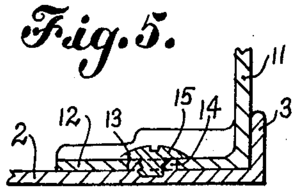
Fig. 5 is a section on the line 5—5 Fig. 1.
Figures 4, 6, 7:
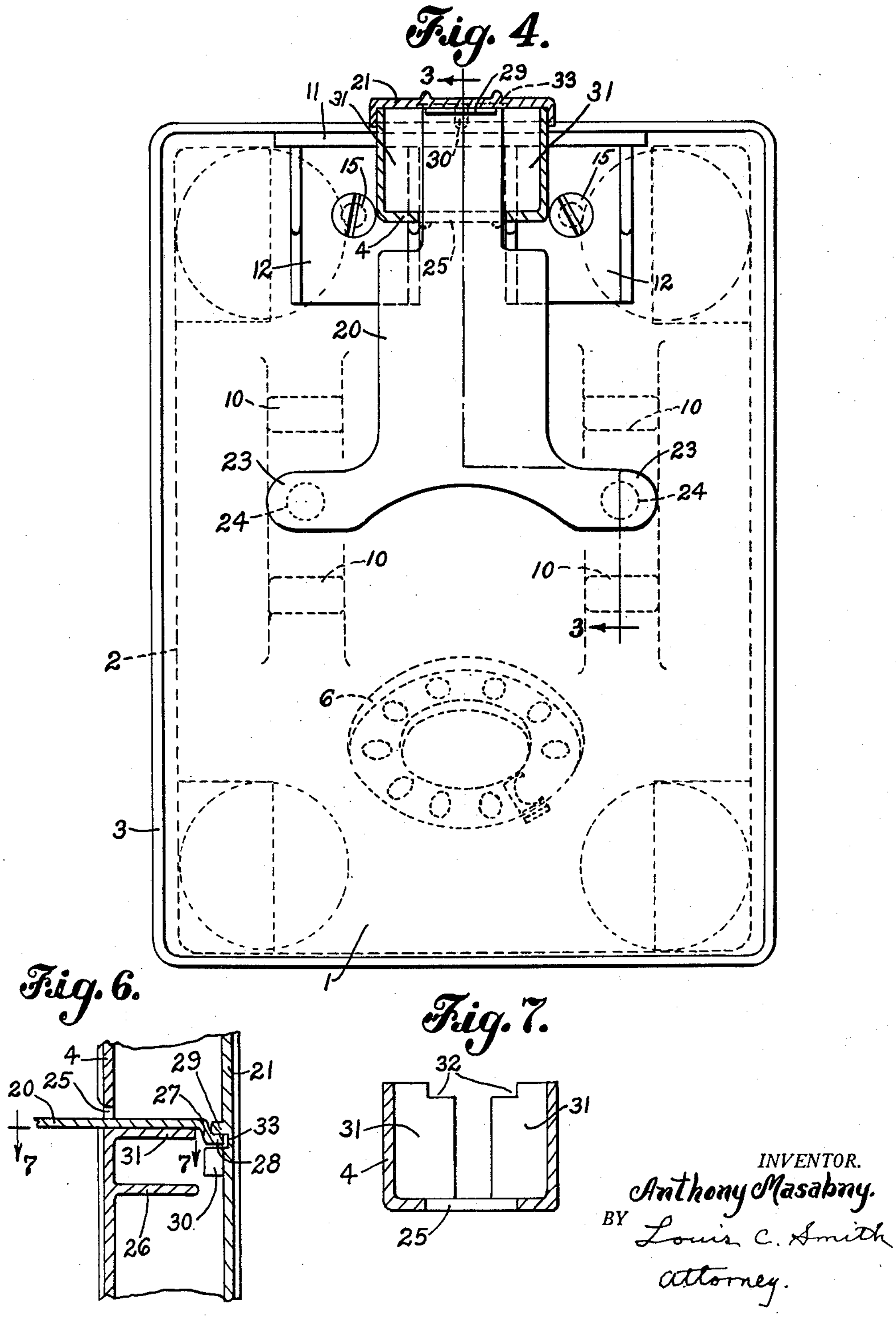
Fig. 4 is a section on the line 4—4 Fig. 1.
Fig. 6 is a fragmentary section on the line 6—6 Fig. 1.
Fig. 7 is a section on the line 7—7 Fig. 6.

For this purpose I employ a switch of the automatically closing type and provide a switch control member 20 which is pivotally connected to the back wall 21 of the column and extends over the knob 22 of the switch, through an opening 25 in the front wall of the column and forwardly from the column, the front end of said switch control member having two lateral extensions 23 which overlie the two control pins 24 of the telephone set and underlie the receiver 9 when the latter is on the cradle as seen in Fig. 2.

When the receiver 9 is in its cradle 10 its weight holds the switch control member 20 in its lowered position, as shown in Fig. 2 and in dotted lines Fig. 3, and through the extensions 23 holds the control pins 24 of the telephone depressed as usual when the receiver is in its cradle. The switch control member engages the knob 22, and when said member is in its lowered position the knob 22 is held depressed and the switch 18 is thereby held open. When the receiver 9 is lifted from the cradle 10 the downward pressure thereof on the switch-controlling member 20 is eliminated and said member is moved upwardly from the dotted line position to the full line position in Fig. 2 by the upward movement of the control pins 24. Such upward movement relieves the pressure on the knob 22 of the switch 18 by which it was held open, and said switch automatically closes thereby lighting the bulb 5 which will remain lighted until the receiver is again placed in its cradle.

The pivotal connection between the switch-controlling member 20 and the back wall 21 of the column 4 is best shown in Fig. 2. The inner end of said member is bent downwardly at 27 and then backwardly at 28, and said end 28 is received between a rib 29 on the back wall 21 and a projection 30 extending forwardly from said wall and projects into a recess 33 formed in said back wall.

The switch-controlling member 20 is held from forward movement by two flanges 31 extending from the side and front walls of the column 4 and on which the rear end of the said member 20 rests, said flanges having notches 32 to receive the downwardly bent portion 27 of said member. The engagement of the portion 27 of the member 20 with the rear edges of the flanges 31 prevent forward movement of the switch control member 20, and the recess 33 in which the end 28 of the switch control member 20 is received together with notches 32 hold the rear end of said member 20 from sidewise movement.

The back wall 21 of the column 4 is shown as being removable thereby to provide access to the switch 18 and to the light socket 31, which, it will be noted, is mounted on said back wall. Said wall is removably retained in place by screws 34 which screw into tapped holes in the bosses 35.

From the above it will be seen that I have provided a simple dial illuminator for telephone sets which can be quickly and easily associated with a telephone and which operates to illuminate the dial when the receiver is lifted from its cradle and to shut off the illumination when the receiver is replaced.

I claim:

1. An illuminating device for a dial telephone set that includes a dial, a removable receiver, a cradle for supporting the receiver when the telephone is not in use, and telephone-circuit control pins adapted to be held in inoperative position by the receiver when it is in the cradle, said illuminating device having a tray-like base on which the telephone instrument is removably supported, a hollow column rising from the base at the rear side thereof to a point above a telephone instrument resting on said base, an electric light bulb at the top of the column for illuminating the dial of the telephone instrument, a circuit for said light bulb, said column having an opening in its front wall at a point directly opposite the cradle of a telephone set resting on the base and also having in its interior a shelf extending rearwardly from the front wall a short distance below the opening therein, an automatically closing switch mounted on said shelf and connected in said circuit, said switch having an upstanding depressible knob which in its raised position maintains the circuit closed and in its depressed position opens the circuit, a switch-controlling member pivoted to the rear wall of the column for limited up and down movement and extending forwardly over the depressible knob and through said opening and to a point sufficiently beyond the column to reach the cradle of a telephone set resting on said base, the outer end of said switch-closing member having oppositely disposed lateral extensions which overlie the control pins of such a telephone set and are positioned to be engaged by the telephone receiver when the latter is resting on the cradle, whereby when the telephone is not in use the weight of the receiver on the cradle holds the switch-controlling member in lowered position in which it, in turn, holds the knob depressed and the circuit open, while when the receiver is removed from the cradle and the switch-controlling member is relieved from the weight thereof the switch will automatically close and thereby light the bulb.

2. An illuminating device for a dial telephone set that includes a dial, a removable receiver and a cradle for supporting the receiver when the telephone is not in use, said illuminating device having a tray-like base on which the telephone instrument is removably supported, a hollow column rising from the base at the rear side thereof to a point above a telephone instrument resting on said base, an electric light bulb at the top of the column for illuminating the dial of the telephone instrument, a circuit for said light bulb, said column having an opening in its front wall below the light bulb and also having in its interior a shelf extending rearwardly from the front wall below the opening therein, an automatically closing switch mounted on said shelf and connected in said circuit, said switch having an upstanding depressible knob which in its raised position maintains the circuit closed and in its depressed position opens the circuit, a switch-controlling member extending forwardly from the rear wall of said column over the depressible knob and through said opening to a point to reach the cradle of the telephone set resting on said base and to be engaged by the receiver of such set, the rear end portion of the switch-controlling member being bent downwardly and then rearwardly so that the rear edge of said member is offset downwardly from the body thereof, the rear wall of the column having a recess in its inner face in which the offset rear edge of the switch-controlling member is received, thereby providing a pivotal connection between said switch-controlling member and said rear wall, each side wall of the column having an inwardly projecting retaining flange underlying the switch-controlling member, which flanges have portions engaging the front face of the downwardly bent portion of the switch-controlling member and co-operating therewith to prevent forward movement thereof, thereby retaining the rear edge of said switch-controlling member in the recess.

3. An illuminating device for telephone sets as defined in claim 2 in which said flanges are cut away near their rear ends to provide shoulders that engage the front face of the downwardly bent portion of the switch-controlling member and thereby prevent forward movement thereof.

ANTHONY MASABNY.

References Cited in the file of this patent

UNITED STATES PATENTS

| Number | Name | Date |
|---|---|---|
| 1,945,956 | Rowell | Feb. 6, 1934 |
| 2,020,016 | Brusseau | Nov. 5, 1935 |
| 2,336,604 | Edward et al. | Dec. 14, 1943 |
| 2,464,595 | Masabny | Mar. 15, 1949 |

FOREIGN PATENTS

| Number | Country | Date |
|---|---|---|
| 497,535 | Belgium | Dec. 1, 1950 |